US012646123B2

(12) United States Patent
Klocman et al.

(10) Patent No.: US 12,646,123 B2
(45) Date of Patent: Jun. 2, 2026

(54) SYSTEMATIC OUTAGE PLANNING AND COORDINATION IN A DISTRIBUTION GRID

(71) Applicant: Florida Power & Light Company, Juno Beach, FL (US)

(72) Inventors: Justin D. Klocman, Boca Raton, FL (US); Robert H. Adams, Jr., Davie, FL (US); Erenio S. Reiner, Miami, FL (US); Vesna A. Alvarez, Hollywood, FL (US); Renee M. McVety, West Palm Beach, FL (US)

(73) Assignee: Florida Power & Light Company, Juno Beach, FL (US)

( * ) Notice: Subject to any disclaimer, the term of this patent is extended or adjusted under 35 U.S.C. 154(b) by 654 days.

(21) Appl. No.: 16/855,827

(22) Filed: Apr. 22, 2020

(65) Prior Publication Data

US 2021/0334910 A1     Oct. 28, 2021

(51) Int. Cl.

| | |
|---|---|
| *G06Q 10/00* | (2026.01) |
| *G01D 4/00* | (2006.01) |
| *G06Q 10/0631* | (2023.01) |
| *G06Q 50/06* | (2012.01) |
| *H02J 3/001* | (2026.01) |

(52) U.S. Cl.
CPC .............. *G06Q 50/06* (2013.01); *G01D 4/002* (2013.01); *G06Q 10/06312* (2013.01); *H02J 3/001* (2020.01)

(58) Field of Classification Search
CPC .............. G06Q 50/06; G06Q 10/0631; G06Q 10/06312; G06Q 10/06
USPC .......................... 713/300, 310, 320, 330, 340
See application file for complete search history.

(56) References Cited

U.S. PATENT DOCUMENTS

| | | | |
|---|---|---|---|
| 5,920,846 | A | 7/1999 | Storch et al. |
| 7,236,976 | B2 | 6/2007 | Breitenbach et al. |
| 7,739,138 | B2 | 6/2010 | Chauhan et al. |
| 7,860,615 | B2 | 12/2010 | Nelson et al. |
| (Continued) | | | |

FOREIGN PATENT DOCUMENTS

| | | |
|---|---|---|
| CN | 109190777 | 1/2019 |
| CN | 109740837 | 5/2019 |
| (Continued) | | |

OTHER PUBLICATIONS

Generac, "Current Power Outage", 2018 (Year: 2018).*
(Continued)

*Primary Examiner* — Brian M Epstein
*Assistant Examiner* — Reham K Abouzahra
(74) *Attorney, Agent, or Firm* — TROUTMAN PEPPER LOCKE LLP; Dustin B. Weeks; Bo Yang

(57) ABSTRACT

Disclosed is a system and method for automated outage and workflow planning system in a distributed electrical power grid with planned de-energization of electrical equipment as opposed to responding to an unplanned power outage. An automated system provides core conflict resolution and power outage planning. The present invention automatically notifies requestors of upcoming work orders. In addition, the present invention reduces scheduling inefficiencies by requiring requestors to confirm, decline, or edit on the fly their pending work order(s). The system also determines if all the orders are not completed and places the order back on the calendar for another day.

18 Claims, 5 Drawing Sheets

(56)                    References Cited

U.S. PATENT DOCUMENTS

| | | | | |
|---|---|---|---|---|
| 8,214,243 | B2 | 7/2012 | Graham et al. | |
| 8,676,388 | B2 | 3/2014 | Dodderi et al. | |
| 9,697,496 | B2 | 7/2017 | Hamilton et al. | |
| 9,874,593 | B2 | 1/2018 | Kang et al. | |
| 9,891,645 | B2 | 2/2018 | Yu et al. | |
| 2003/0187865 | A1* | 10/2003 | Frisina | G06Q 10/06 707/999.102 |
| 2008/0256132 | A1* | 10/2008 | Munro | G06Q 10/00 |
| 2009/0254407 | A1* | 10/2009 | Fagan | G06Q 10/06 705/7.23 |
| 2009/0300694 | A1* | 12/2009 | Campagna | H04N 21/4583 725/152 |
| 2010/0205014 | A1 | 8/2010 | Sholer et al. | |
| 2011/0029142 | A1 | 2/2011 | Sun et al. | |
| 2011/0071690 | A1 | 3/2011 | Sun et al. | |
| 2011/0196630 | A1* | 8/2011 | Dong | H02J 3/0073 702/62 |
| 2011/0208366 | A1* | 8/2011 | Taft | H04L 67/59 340/5.32 |
| 2012/0173296 | A1* | 7/2012 | McMullin | G06Q 10/063112 705/7.14 |
| 2013/0102333 | A1* | 4/2013 | Dam | G06Q 10/0631 455/457 |
| 2014/0279571 | A1* | 9/2014 | Cox | G09B 29/007 705/305 |
| 2015/0073849 | A1* | 3/2015 | Meyer | G06Q 10/063114 705/7.15 |
| 2015/0178865 | A1* | 6/2015 | Anderson | G06Q 50/163 705/7.25 |
| 2015/0213415 | A1 | 7/2015 | Yang et al. | |
| 2015/0261241 | A1* | 9/2015 | McKeag | H02J 3/001 700/295 |
| 2015/0339634 | A1* | 11/2015 | Xiao | G06Q 10/20 705/7.13 |
| 2015/0347987 | A1* | 12/2015 | Ali | G06Q 10/1097 705/7.21 |
| 2016/0156186 | A1 | 6/2016 | Sun et al. | |
| 2016/0276831 | A1* | 9/2016 | Karlak | G06Q 50/06 |
| 2018/0025458 | A1 | 1/2018 | Swamy | |
| 2018/0267494 | A1 | 9/2018 | Meranda et al. | |
| 2019/0102723 | A1* | 4/2019 | Gupta | G06N 3/08 |
| 2019/0102751 | A1 | 4/2019 | Arya et al. | |
| 2019/0215240 | A1 | 7/2019 | Li et al. | |
| 2020/0065628 | A1* | 2/2020 | Olnick | G01R 21/133 |

FOREIGN PATENT DOCUMENTS

| | | | |
|---|---|---|---|
| WO | WO-2004104891 A1 * | 12/2004 | G06Q 10/063112 |
| WO | 2015096153 | 7/2015 | |
| WO | 2019056564 | 3/2019 | |
| WO | 2019168429 | 9/2019 | |
| WO | 2019233047 | 12/2019 | |

OTHER PUBLICATIONS

E.B. Evangelista, "Automatic contingency analysis integration to an expert system in scheduled outage", IEEE (Year: 2001).*

H. Ogi, "An expert system with cognitive model for power system outage scheduling", IEEE (Year: 1989).*

Outage Management—Proconex Emerson Impact Partner Quarterbacking an Outage Coordination and Turnaround Management Project 2019.

Limit outages with Outage Management System (OMS) Outage Management System (OMS) Schneider Electric 2019.

Crow Outage Coordination- and Electronic Logging Equinox Software Design Corporation 1999.

Field Service Management Powered by Location Intelligence esri—Telecom, Power Utilities 2019.

Dispatch Management Software Capterra 2019.

* cited by examiner

400

SYSTEMATIC OUTAGE PLANNING AND COORDINATION IN A DISTRIBUTION GRID

FIELD OF THE DISCLOSURE

The present invention generally relates to the field of managing a power grid; and, more particularly, to outage planning and coordination in a distributed electrical power grid.

BACKGROUND

Power distribution grids typically include electricity generation plants, such as natural gas-powered plant, a nuclear-powered plant, solar electric farms, and wind farms, that connect with electric power transmission infrastructure. Electric power transmission infrastructure includes high-voltage transmission lines, electricity distribution stations, and interconnecting switches. Electric utility companies may manage the power grid, including managing faults, maintenance, and upgrades related to the power grid. However, the power grid management is often inefficient and costly, relying on telephone calls from consumers when an outage occurs or on field workers analyzing the local distribution network.

Scheduled maintenance and repairs involve switch plans and repair actions. The switch plans involve isolating the problem and then restoring the problem after repair. This total time of restoration directly affects reliability metrics, so utilities wish to minimize outage durations, minimize the boundaries of the total area affected by outages, and minimize the sections of de-energized grid that are isolated because of outages. Repair estimates are currently calculated by individuals or by simply referring to pre-filled tables.

The outage and work planning for a distributed electrical power grid, which involves planned de-energization of electrical equipment, in contrast with an unplanned power outage, is currently a manually intensive effort. Today, there is no automated systemic offering to provide core conflict resolution and outage planning. The business processes today also do not provide for an automated methodology for notifying requesters of work of upcoming pending work orders. Furthermore, there is no current mechanism to make requestors to confirm, decline, or edit their pending work order(s) on the fly.

SUMMARY OF THE INVENTION

The present invention provides an automated outage and workflow planning system for a distributed electrical power grid. The system is used with planned de-energization of electrical equipment as opposed to responding to an unplanned power outage. The present invention provides an automated system that provides core conflict resolution and outage planning. The present invention automatically notifies requestors of upcoming work orders. In addition, the present invention reduces scheduling inefficiencies by requiring requestors to confirm, to decline, or to edit on the fly their pending work order(s).

More specifically disclosed is a system, a method, and a computer program product for managing outages and maintenance planning in a distributed electrical power grid. An order is received via a graphical user interface on a requestor device. The order includes a request date and type of service. The order is part of a request for service or maintenance of a piece of selected electrical equipment in a distributed electrical power grid. A database of requests is accessed to identify conflicts with other orders for the distributed electrical power grid. Based on a conflict being identified, removing the request from a planning workflow and sending a cancellation notice to the requestor device. Otherwise, in the event of no conflict, in one embodiment, a status tag is retrieved indicating a repair state (e.g., a defective state, a missing state, or a damaged state) of the piece of selected electrical equipment. A first confirmation notification is sent to the requestor device to confirm the request. In one embodiment, the confirmation is populated with the status tag of the piece of selected electrical equipment.

Next, based on receiving a first confirmation of the request from the requestor device, storing the request with a status of new (SNEW) in the database and sending a request notification to the requestor device that the request has been placed. Otherwise, in response to not receiving the first confirmation, cancelling the request and sending a cancellation notice due to lack of verification to the requestor device.

Next, a planning manager (CCSL) reviews the request for other types of conflicts. Based on another type of conflict being identified, changing the status of the request to modify (RMOD) in the database and sending a modify notice to the requestor device. Otherwise, if the planning manager does not identify any conflicts, building out sub-steps (PQ steps) is required to fulfill the request. A second confirmation notification is sent to the requestor device to confirm the request to confirm the request. In one embodiment, the second confirmation notification is populated with the status tag of the selected electrical equipment and storing the request with a status of approved (APPV) in the database;

Continuing further, based on receiving the second confirmation of the request from the requestor device, leaving the status of the request to approved (APPV) in the database, otherwise changing the requested date out to a future date, changing the status of the request to modify (RMOD) and sending a date modified notice to the requestor device.

Lastly, based on the status of the request being approved (APPV), the request is dispatched to a crew for maintenance.

In one example, if all the orders are not completed, the above process includes a step of determining that at least one order in the request is not completed by the crew and placing the order back on the calendar for tomorrow. Otherwise, if all the orders are completed, the process includes receiving a work complete confirmation by the crew in response to the order being completed and updating the status of the request to finished (FINI).

In another example, the present invention allows coordination between entities performing the work on the same outage segments. In this example, the process includes retrieving a status tag indicating a repair state (e.g., a defective state, a missing state, or a damaged state) of the piece of selected electrical equipment. Next, based on the type of service for the selected electrical equipment, a de-energized section of the distributed electrical power grid will have power shut off. Any other electrical equipment identified in the de-energized section of the distributed power grid has at least one previous pending order for a previous date. The order and the pending previous order are scheduled on the same date. The customers of the downstream element only experience one instead of two outages due to an improved scheduling process.

In another example, based on the status of the request being approved, the system automatically identifies at least one switchgear and/or one or more reclosers in the distributed electrical power grid that controls the piece of selected electrical equipment. The system automatically sends a control signal to the switchgear and/or the reclosers to maintain a lockout stage that prevents re-energizing at least one piece of selected electrical equipment during a scheduled maintenance period in the request.

BRIEF DESCRIPTION OF THE DRAWINGS

The accompanying figures where like reference numerals, refer to identical or functionally similar elements throughout the separate views, and which, together with the detailed description below, are incorporated in and form part of the specification, serve to further illustrate various embodiments and to explain various principles and advantages all in accordance with the present disclosure, in which.

DETAILED DESCRIPTION

Figure 1:
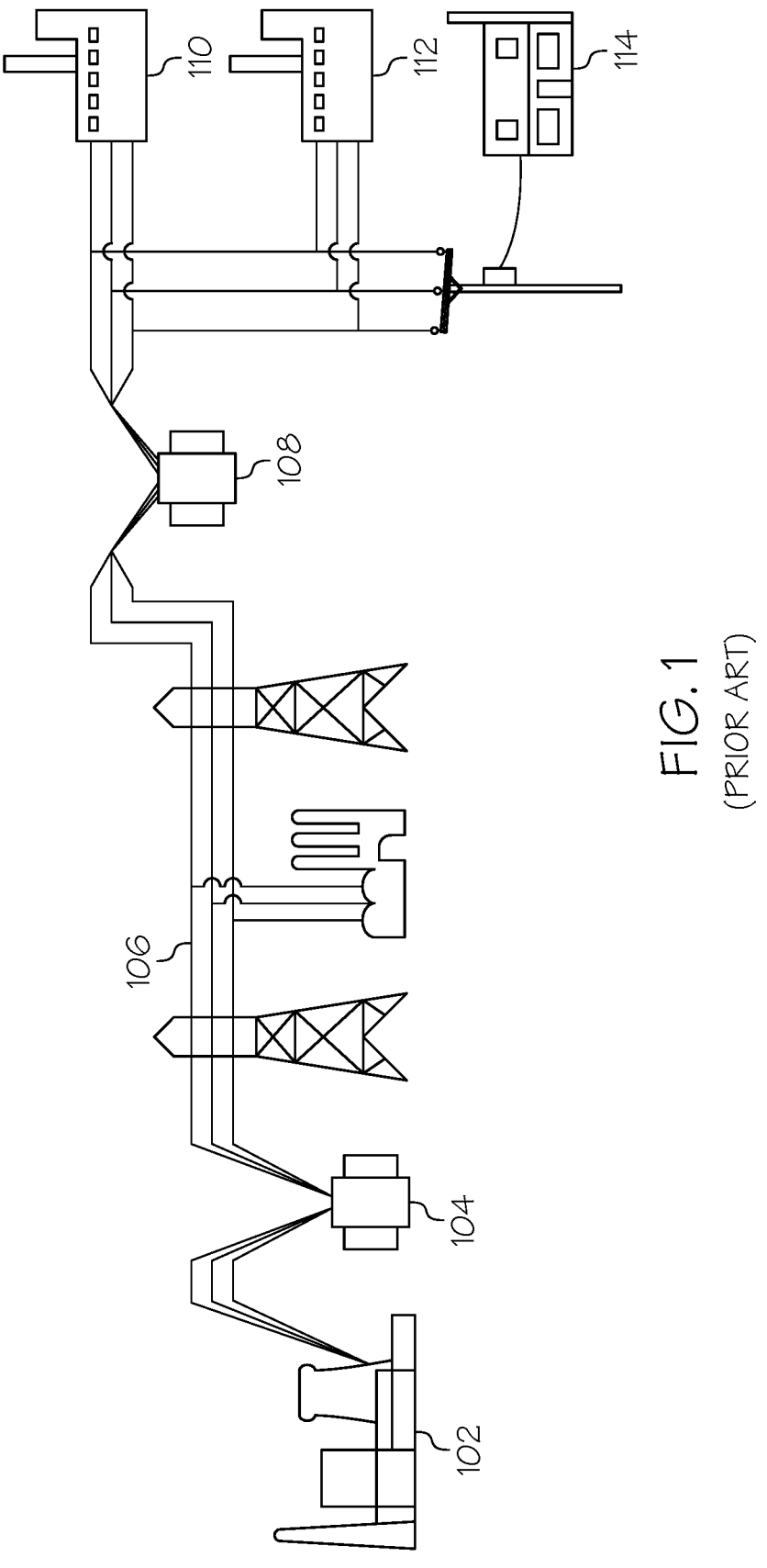
FIG. 1 illustrates a high-level example of a distributed power grid, according to the prior art.

As required, detailed embodiments are disclosed herein; however, it is to be understood that the disclosed embodiments are merely examples and that the systems and methods described below are embodied in various forms. Therefore, specific structural and functional details disclosed herein are not to be interpreted as limiting but merely as a basis for the claims and as a representative basis for teaching one skilled in the art to variously employ the disclosed subject matter in virtually any appropriately detailed structure and function. Further, the terms and phrases used herein are not intended to be limiting but rather to provide an understandable description.

Non-Limiting Definitions

Generally, the terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly and not necessarily mechanically. The term "configured to" describes hardware, software, or a combination of hardware and software that is adapted to, set up, arranged, built, composed, constructed, designed, or that has any combination of these characteristics to carry out a given function. The term "adapted to" describes hardware, software, or a combination of hardware and software that is capable of, able to accommodate, to make, or that is suitable to carry out a given function.

The term "confirmation" is a portion of the workflow for maintenance and repair in which a party, typically a requestor or dispatcher, must affirmatively respond to a prompt for the workflow to continue down a maintenance path or repair path. In the event that no confirmation is received, the workflow will branch to an alternative path that puts the order in a holding or canceled state.

The term "conflict" is an incompatibility between two orders. The incompatibility is typically due to which portion or portions of a distributed power grid is being de-energized during a given time-frame due to another user requesting the same or adjacent portion of the grid during the same time-frame.

The term "crew" means a group of one or more personnel, employees or contractors to work to maintain or replace electrical equipment.

The term "de-energized" means a piece of electrical equipment in which electrical energy is shut-off or the electricity has been disconnected.

The term "distributed power grid" is an interconnected network for delivering electricity from producers to consumers. It includes generating stations that produce electric power, electrical substations for stepping electrical voltage up for transmission or down for distribution, and high-voltage transmission lines that carry power from distant sources to demand-centers.

The term "down-stream electrical equipment" refers to electrical equipment on the same electrical circuit that is also de-energized when a component typically geographically closer (i.e., up-stream electrical equipment) to the electricity generation plant or sub-station is de-energized.

The term "electrical equipment" means one or more components, assets, or infrastructure in a distributed power grid that is both required for operation and maintained or repaired. Examples of electrical equipment include transmission lines, wires, switches, transformers, insulators, circuit breakers, connectors, lighting protection, busbars, isolators and more.

The term "feeder lines" or just "feeders" are the power lines through which electricity is transmitted in power systems. The feeder transmits power from a generating station or substation to the distribution points.

The term "graphical user interface" or GUI a visual way of interacting with a computer using items such as windows, icons, and menus, used by computing devices, including computers, smartphones, tablets, laptops, and other connected devices.

The term "order" is a component or portion of a request. For example, one request may generate two or more orders. The may be one order for the delivery of electrical equipment and another order for scheduling personnel or a crew to install the equipment.

The term "recloser" or "automatic circuit reclosers (ACRs)" is a class of switchgear to detect and interrupt momentary faults. ACRs can be thought of as high voltage-rated circuit breakers with integrated current and voltage sensors and a protection relay.

The term "request" is a request for maintenance or repair of electrical equipment in a distributed power grid.

The term "status tag" is a tag that may be physical or just exist in a database or both, and it indicates a repair state of electrical equipment. The repair state denotes the defective state, missing state, or damaged state of the electrical equipment.

The term "switchgear" is composed of electrical disconnect switches, fuses, or circuit breakers used to control, protect, and isolate electrical equipment. Switchgear is used both to de-energize equipment to allow work to be done and to clear faults downstream.

The term "work flow" is a series of business processes and rules in which an order must pass from initiation to completion.

Overview

The present invention provides an automated outage and workflow planning system in a distributed electrical power grid with planned de-energization of electrical equipment as opposed to responding to an unplanned power outage. The present invention provides an automated system that provides core conflict resolution and outage planning. The present invention automatically notifies requestors of upcoming work orders. In addition, the present invention reduces scheduling inefficiencies by requiring requestors to confirm, to decline, or to edit on the fly their pending work order(s).

If an outage is scheduled at one point in a distributed power grid, then power is also cut to downstream resources. The present invention allows planned work to be scheduled on downstream resources while power is out due to work on upstream resources. Unlike prior solutions, the present invention provides a unique improvement because the overall customer outage time is reduced. State differently, the customers of the downstream element only experience one instead of two outages due to an improved scheduling process.

The present invention overcomes the problem with the prior art when the switching and repair actions are not fully automated. The present invention includes the time a dispatched work crew requires to have the outage added to the repair time in the restoration estimations. This time for a dispatched crew is dependent on a work crews' current position, and the ability of the crew to repair the outage depends on the equipment inventory. Unlike previous systems, the present invention provides time estimations to restore and repair and equipment availability, that is, the total switching times.

The present invention provides visibility to real-time work to accurately enable dispatch resources to prepare for the" 'day's work and not bottleneck the resources as they call for permission to execute planned switching and outage work.

Distributed Power Grid

Turning now to FIG. 1 illustrates a high-level example of a distributed power grid 100, according to the prior art. The distributed power grid 100 typically includes electricity generation plants 102, such as a natural gas-powered plant, a nuclear-powered plant, solar electric farms, and wind farms. These electricity generations 102 is electrically connected with a step-up transformer 104. The step-up transformer 104 increases the voltage from primary to secondary. Electricity is transmitted at a high voltage on transmission lines 106 to increase efficiency. Common high voltages are 765 kV, 500 kV, 345 kV, 230 kV and 138 kV. The lower current that accompanies high-voltage transmission reduces resistance in the conductors as electricity flows along the cables. This means that thin, lightweight wires for transmission lines 106 are used in long-distance transmission.

The transmission lines 106 are electrically connected to a step-down transformer 110. The step-down transformer decreases the voltage from primary to secondary to be used by typical 26 kV and 69 kV sub-station customer 112, a 13 kV and 4 kV customer 114, and a 120 v and 240 V customer 116, as shown.

Major Electrical Components of a Distributed Power Grid—Example 1

Figure 2:
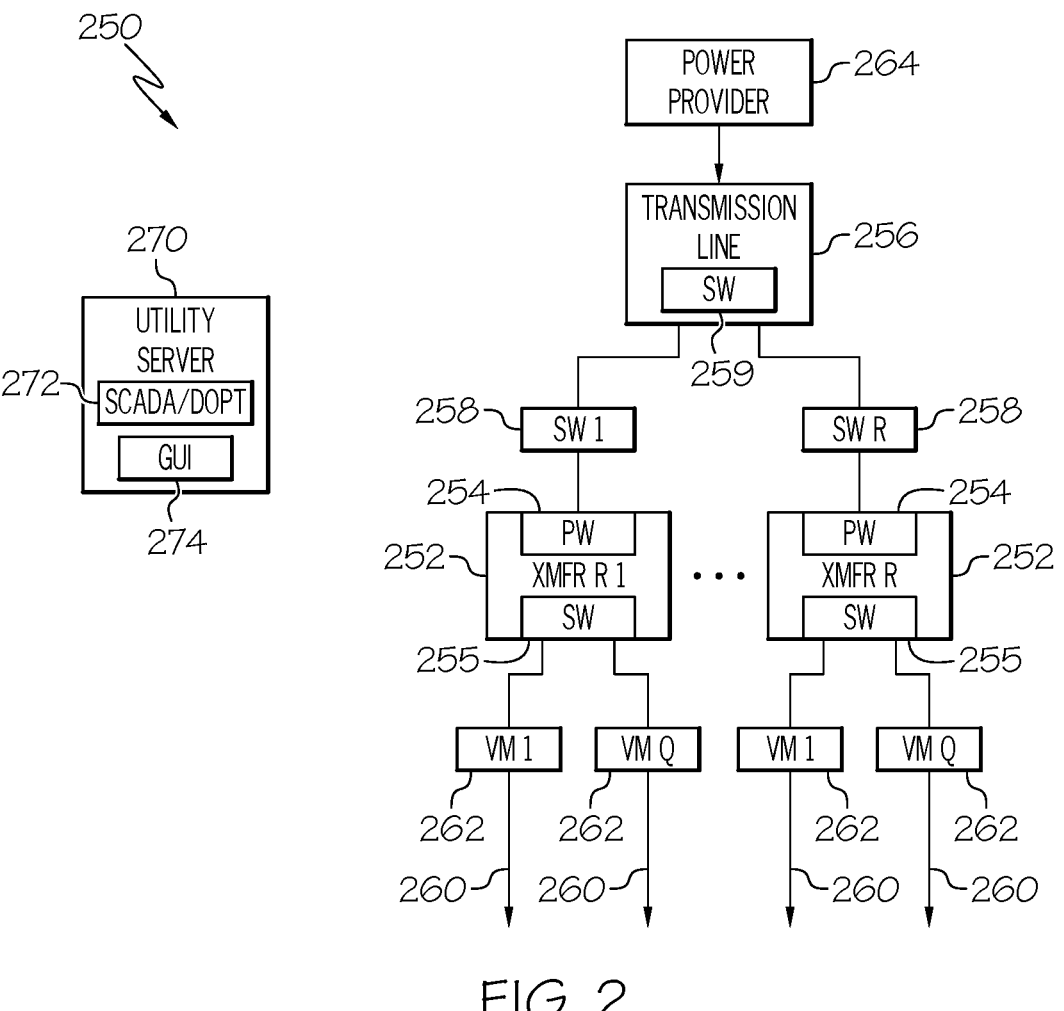
FIG. 2 illustrates an example of the major electrical components of a distributed power grid of FIG. 1, according to one aspect of the present invention.

FIG. 2 illustrates an example of the major electrical components of a distributed power grid of FIG. 1, according to one aspect of the present invention. The power distribution system 200 includes R number of three-phase transformers 252 (labeled "XMFR"), wherein R is an integer greater than or equal to two. Each three-phase transformer 252 has a primary winding 254 and a secondary winding 255. Each three-phase trans former 252 is implemented, for example, as a delta-wye transformer, wherein the primary winding 254 is implemented as delta windings and the secondary winding 255 is implemented as wye-windings.

A transmission line 256 is connected to the primary winding 254 of each three-phase transformer 252. Additionally, a switch 258 (e.g., a high-side TX interrupter) is physically and logically positioned upstream of each primary winding 254, such that there are R number of switches 258. In situations where a given switch 258 is opened, power does not flow to the primary winding 254. Conversely, in situations where the given switch 258 is closed, power flows through the transmission line 256 to the primary winding 254. Further, a switch 259 (e.g., a transmission line switch) are coupled along the transmission line 256. If the switch 259 is opened, no power is provided to any of the downstream primary windings 254 of the three-phase transformers 252. Conversely, if the switch 259 is closed, power flows to each switch 258 and to each downstream primary winding 254 of a corresponding three-phase transformer 252.

Q number of feeder lines 260 are connected to the secondary winding 255 of each three-phase transformer 252, where Q is an integer greater than or equal to one. Moreover, each three-phase transformer 252 can have a different number of feeder lines 260 connected thereto. Each feeder line 260 carries a three-phase voltage signal that are provided to a plurality of customer premises via additional electrical equipment (e.g., additional transformers and transmission lines). A three-phase voltmeter 262 is coupled to each of the transmission lines, such that there are Q number of three-phase voltmeters 262 downstream of each secondary winding 255 of each three-phase transformer 252.

A power provider 264 can provide three-phase power on the transmission line 256. The power provider 264 is representative of a power generator, such as a power plant such as a wind farm, a solar system, a thermal solar field, a fossil fuel-based power generator (e.g., a coal or natural gas power generator) or a nuclear power generator and attendant constituent structures or any combination thereof. Alternatively, the power provider 264 could be implemented as a stored power system (e.g., a battery system).

A utility server 270 communicates directly or indirectly with electrical components of the power distribution system 250. The utility server 270 includes a memory for storing machine-executable instructions and a processing unit comprising one or more processor cores that access the memory and execute the machine-readable instructions. In some examples, the utility server 270 is implemented as a stand-alone server or part of an enterprise system (e.g., in a computing cloud) or in communication with such an enterprise system, such as a supervisory control and data acquisition (SCADA) system 272 that may be coupled to a DOPT tool described further below.

The utility server 270 includes a graphical user interface (GUI) 274 that outputs data uniquely identifying the given switch 258 or 259 from the plurality of switches 258 or 259. In some examples, the alert is output by the GUI 274 as a chart. In this manner, defective switches (e.g., switches with an open pole) can be easily identified without the installation of additional hardware on the power distribution system 250.

Major Electrical Components of a Distributed Power Grid—Example 2

Figure 3:
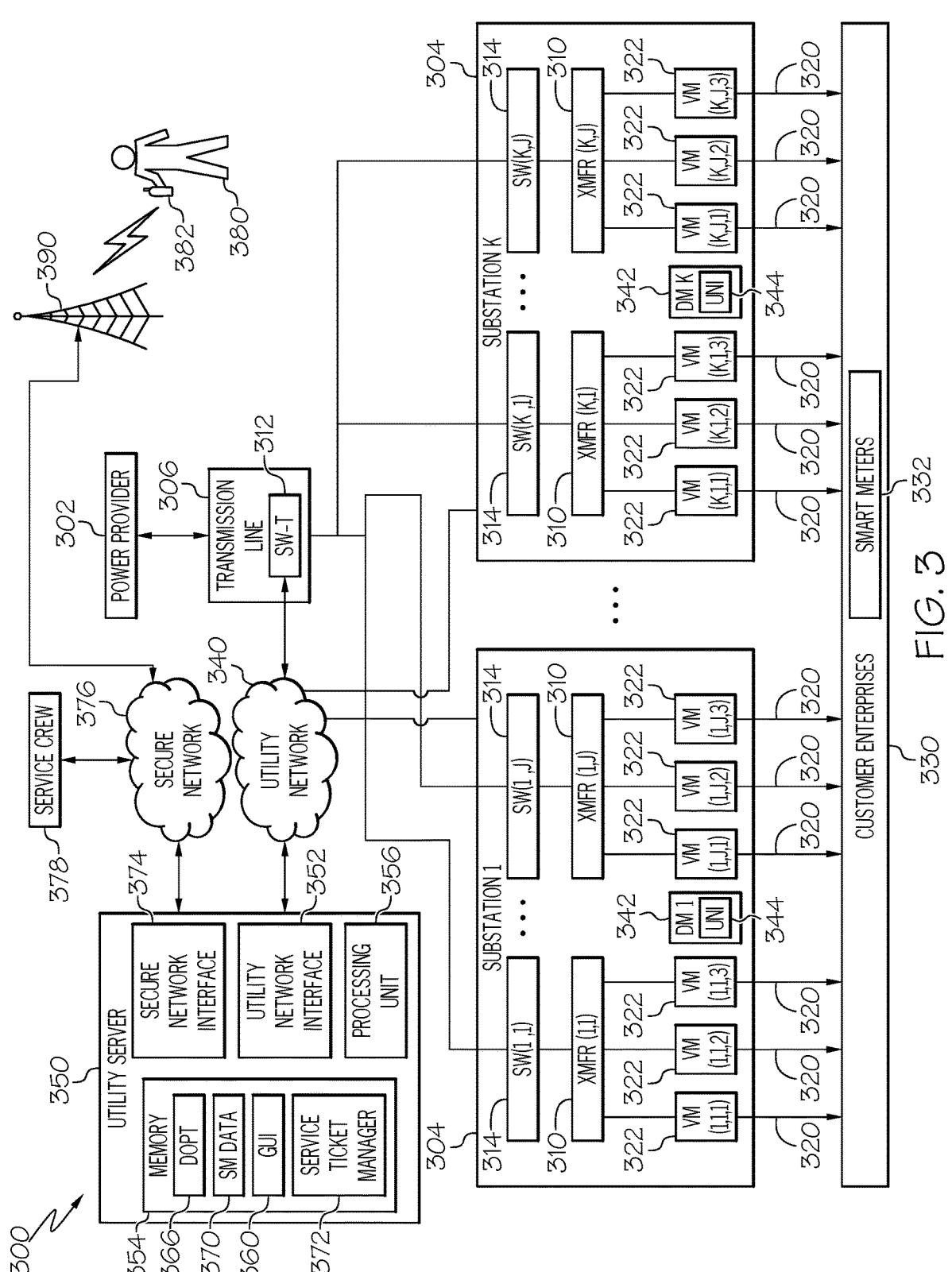
FIG. 3 illustrates another example of the major electrical components of a distributed power grid of FIG. 1, according to one aspect of the present invention; and FIG. 4A

FIG. 3 illustrates another example of the major electrical components of a distributed power grid of FIG. 1, according to one aspect of the present invention. The power provider 302 provides electrical power. In some examples, the power provider 302 generates electric power, and in other examples, power provider 302 supplies stored electrical power. The power provider 302 could be implemented as a power plant, such as a wind farm, a solar system, a thermal solar field, a fossil fuel-based power generator (e.g., a coal or natural gas power generator), or a nuclear power generator and attendant constituent structures or any combination thereof. Alternatively, the power provider 302 could be implemented as a stored power system (e.g., a battery system). The power provider 302 transmits a high-voltage, alternating current (AC) power signal (such as a 115 or 220 kilovolt (kV) AC power signal) to K number of substations 304 via a transmission line 306 (e.g., a single transmission line or multiple transmission lines), where K is an integer greater than or equal to one.

Each of the K numbers of substation 304 transforms the high-voltage AC power signal into a mid-voltage power signal. For example, it may be desirable in some circumstances to step down (or to step up) voltage via one or more substation 304 electrical components to phase-shift and/or otherwise to adjust current phase or amplitude, for instance, to achieve a desired power function as specified by the kind of load and/or to minimize energy lost in the power distribution system 300. As one example, each of the K number of substations 304 includes J number of three-phase transformers 310 (labeled "XMFR") for transforming and conditioning a 230 kV or 115 kV AC signal into a 13.8 kV AC signal or 23 kV AC signal. It is to be appreciated that in yet other examples, different input and output voltages could be implemented. In each such situation, each substation 304 can have the same or different number of three-phase transformers 310. It is noted that the power distribution system 300 may include more than one power provider 302.

Each of the J numbers of three-phase transformers 310 includes a two-dimensional index number (i,j). In such a situation, the first number, i identifies a substation 304 in which the three-phase transformer 310 is located. The second number, j, indicates the number of the three-phase transformer 310 within a respective substation 304. As an example, the first three-phase transformer 310 in the Kth substation 304 is labeled and referred to as the three-phase transformer (K,1). Similarly, the Jth three-phase transformer 310 in the first substation 304 is labeled and referred to as the three-phase transformer (1,J). In this manner, each three-phase transformer 310 is uniquely identified.

Each of the J number of three-phase transformers 310 at each of the K number of substations 304 are implemented a delta-wye transformer. In such a situation, the transmission line 306 are connected to a primary winding (e.g., a delta winding) at each of the J number of three-phase transformers 310.

A transmission line switch 312 (labeled SW-T) is logically and physically positioned along the transmission line 306. The transmission line switch 312 has two states. In an open state, the transmission line switch 312 disconnects power flowing between the power provider 302 and each of the J number of three-phase transformers 310 at each of the K number of substations 304. Conversely, in a closed state, the transmission line switch 312 allows electricity to flow from the power provider 302 to each of the J number of three-phase transformers 310 at each of the K number of substations 304.

Similarly, switches implemented as high-side TX interrupters 314 (labeled "SW") are physically and logically connected upstream of each of the K number of three-phase transformers 310 along the transmission line 306. Each of the high-side TX interrupters 314 includes a closed state that allows power to flow to a downstream three-phase transformer 310 and an open state that prevents power from flowing to the downstream three-phase transformer 310. Each high-side TX interrupter 314 is labeled with the same index number as the downstream three-phase transformer 310. For instance, the high-side TX interrupter (1,1) is upstream of the three-phase transformer (1,1).

Feeder lines 320 are connected downstream from each three-phase transformer 310. More particularly, each feeder line 320 is connected to a secondary winding of a respective three-phase transformer 310. In examples where each three-phase transformer 310 is implemented as a delta-wye transformer, each feeder line 320 is coupled to a wye winding of the respective three-phase transformer 310. In this manner, components upstream from each three-phase transformer 310, including each high-side TX interrupter 314 and the transmission line switch 312 are galvanically isolated from the feeder lines 320.

In the example illustrated, each three-phase transformer 310 has three (3) feeder lines 320 connected downstream. However, in other examples, there could be more or less feeder lines 320 connected to each three-phase transformer 310. Additionally, different three-phase transformers 310 can have different number of feeder lines 320 connected. Each feeder line 320 carries a three-phase voltage signal that is monitored by a respective three-phase voltmeter 322. Each three-phase voltmeter 322 monitors a voltage on each phase of the feeder line 320 (carrying a three-phase voltage signal). Additionally, each three-phase voltmeter 322 generates voltage data characterizing a present voltage on each phase of the feeder line 320. Each three-phase voltmeter 322 is labeled an index number (i,j,k), where i,j identify the upstream transformer and the index number k identifies the particular three-phase voltmeter 322 and the feeder line 320 to which the three-phase voltmeter 322 is connected.

Each feeder line 320 supplies voltage to a plurality of downstream customer premises 330. Each customer premise 330 are implemented as an industrial or residential consumer of electric power. Additionally, each customer premise 330 is equipped with a smart meter 332 (alternatively referred to as a meter) that monitors an incoming power signal and consumption at the respective customer premise 330.

In the example illustrated, the plurality of customer premises 330 and the smart meters 332 are collectively represented by a single component. In practice, there are thousands or millions of individual customer premises 330. Additionally, electrical infrastructure downstream from the K number of substations 304, such as step-down transformers, are omitted for the purpose of simplifying the explanation. Furthermore, it is understood that each customer premises 330 may be connected (directly or indirectly) to a subset of the feeder lines 320 in contrast to the example illustrated, in which every feeder line 320 is connected to the collective representation of the plurality of customer premises 330.

The transmission line switch 312 is connected to a utility network 340. Similarly, each high-side TX interrupter 314 is connected to the utility network 340 via a data monitor 342 installed at each of the K number of substations 304. The data monitor 342 is implemented, for example, as a computing device (e.g., a programmable logic controller or a general-purpose computer). The data monitor 342 includes a utility network interface (UNI) 344 for communicating on the utility network 340. The utility network interface 344 could be a wireless or wired network interface card configured to communicate on the utility network 340. The utility network 340 could be a mesh network, such as an Internet Protocol version 6 (IPv6) network or a network that employs the Transmission Control Protocol/Internet Protocol (TCP/IP).

For the purpose of simplifying the explanation, individual connections between the utility network 340 and each data monitor 342 are omitted. Instead, a collective connection between each substation 304 and the utility network 340 is included to collectively represent communications between components within a respective substation 304 and the utility network 340. The transmission line switch 312 and each high-side TX interrupter 314 provide switch data characterizing an operating state (e.g., tripped, open, or closed). Additionally, each three-phase voltmeter 322 provides voltage data characterizing a (real-time) measured voltage for each phase of a respective feeder line 320 to the corresponding data monitor 342.

A utility server 350 (e.g., a computer system) can also be connected to the utility network 340 via a utility network interface 352 (e.g., a network interface card). The utility server 350 is implemented by a utility provider (e.g., a power provider), such as a utility provider that controls the K number of substations 304 and/or the power provider 302. The utility server 350 includes memory 354 to store machine-executable instructions. The memory 354 is implemented as a non-transitory machine-readable medium. The memory 354 could be volatile memory (e.g., random access memory), non-volatile memory (e.g., a hard drive, a solid-state drive, flash memory, etc.), or a combination thereof. The utility server 350 includes a processing unit 356 (e.g., one or more processor cores) that accesses the memory 354 and executes the machine-readable instructions.

In some examples, the utility server 350 is (physically) implemented at facilities controlled by the utility provider. In such a situation, the utility server 350 could be representative of multiple servers (e.g., a server farm). Additionally or alternatively, the utility server 350 (or a portion thereof) is implemented in a remote computing system, such as a computing cloud. In such a situation, features of the utility server 350, such as the processing unit 356, the utility network interface 352 (and/or other network interfaces), and the memory 354 could be representative of a single instance of hardware or multiple instances of hardware with applications executing across the multiple of instances (i.e., distributed) of hardware (e.g., computers, routers, memory, processors, or a combination thereof). Alternatively, the utility server 350 could be implemented on a single dedicated computing device.

The utility network 340 can, in some examples, be implemented on (e.g., connected to) a public network, such as the Internet, a private network (e.g., a proprietary network), or a combination thereof (e.g., a virtual private network). In this manner, the utility server 350 establishes a bi-directional communication with each of the K number of data monitors 342 (or some subset thereof) via the utility network 340. Similarly, the utility server 350 establishes a bi-directional communication with the transmission line switch 312 that may be outside the K number of substations 304.

The memory 354 stores application software for controlling the operations of the utility provider. In some examples, the application software can include operations as part of a power delivery diagnostic center (PPDC) and/or a supervisory control and data acquisition (SCADA) system. For example, the memory 354 stores application software for processing and billing systems, various monitoring, customer service, troubleshooting, maintenance, load balancing, accounting and other types of activities that may be used to operate a utility provider.

The memory 354 includes a graphical user interface (GUI) 360 that operates as a front end for a distribution outage planning tool (DOPT) 366, which may be communicatively coupled with other systems, such as a defect detector that monitors data generated by the components of the substations 304 and/or the transmission line 306 to detect potentially improper operation and/or equipment damage. More particularly, the DOPT 366 with the defect detector may monitor the switch data from the transmission line switch 312 and each of the i number of high-side TX interrupters 314 at each of the K number of substations 304 as well as voltage data from each of the three-phase voltmeters 322. The monitored data are employed, for example, to identify a potential open pole (or other defects) on the transmission line switch 312 and/or on a high-side TX interrupter 314. In some examples, switch data from the high-side TX interrupters 314 and/or the transmission line switch 312 and/or voltage data from the three-phase voltmeters 322 are provided directly to the utility server 350. In other examples, switch and/or voltage data may be provided from another server (e.g., operating on a SCADA system).

To demonstrate operations of the utility server 350, several extended examples are provided. In a first example (hereinafter, "the first example"), it is presumed that the high-side TX interrupter (1,J) (labeled "SW (1,J)" has been tripped, opened and reclosed (e.g., toggled). In this situation, the high-side TX interrupter (1,J) provides switch data to the data monitor 342 of the first substation 304.

In response to detecting toggling (e.g., tripping, opening and/or closing) of the high-side TX interrupter 314 the DOPT 366, through a defect detector, monitors the voltage data from three-phase voltmeters 322 for each of the feeder lines 320 downstream of the high-side TX interrupter 314 for a predetermined amount of time (e.g., 5-20 minutes). More particularly, in the first example, in response to toggling of the high-side TX interrupter (1,J), the DOPT 366, through a defect detector, monitors the voltage data from voltmeters (1,J,1), (1,J,2) and (1,J,3).

A requestor 380, can place service requests through the secure network 370 to DOPT application 366 running on the utility server 350. The requestor may be using a requestor device 382 running a program with a graphical user interface, such as a wireless portable device or smartphone, tablet, laptop, or access a dedicated webpage. The data in the request may be in different non-standardized formats dependent on the hardware and software platform used by the one of the requestors. The utility server 350 converts the non-standardized information into the standardized format and stores this standardized, updated information in the memory 354. Using this standardized data, the system can start processing a request as described in FIG. 4 below. Examples of data conversions are forcing the number of characters in a field by padding it with zeros, forcing uppercase only, ignoring non-alphanumeric input, not accepting a request unless mandatory fields are filled in, and more.

In still another embodiment, smart meter data is used to help generate an order. Examples of how smart meter technology may be used is described in U.S. patent application Ser. No. 16/110,260 filed on Aug. 23, 2018, now U.S. Pat. No. 11,481,581 with inventors Bryan J. Olnick et al. entitled "Proactive Power Outage Impact Adjustments Via Machine Learning", and U.S. patent application Ser. No. 15/443,358 filed on Feb. 27, 2017, now U.S. Pat. No. 10,840,691 with inventors Giovanni Herazo et al. entitled "Remote Tracking Of Automatic Lateral Switch Operations", the teachings of each of these two references is hereby incorporated by reference in their entirety. The use of data from a smart meter at a customer or a business premise and other orders are partially generated based on an artificial intelligence (AI) failure prediction process. The AI analyzes data from a multiplicity of smart meters. This AI order may be only a portion of a request or fill the entire request.

Distribution Outage Planning Tool

Continuing further, the present invention provides a distribution outage planning tool (DOPT) 366 that coordinates the scheduling of maintenance tasks (e.g., work orders) on a power distribution system. The DOPT includes a conflict resolution module and a work validation module. The conflict resolution module ensures that work order requests are permissible based on currently pending work orders before scheduling each work order. Upon scheduling non-conflicting work orders, the work validation module is configured to request verification that works for a pending work order is actually going to commence and provides the option to reschedule the work order.

More particularly, the DOPT includes a conflict resolution module that receives a stream of work order requests. Each work order request includes a time and date, a component identifier identifying the electrical equipment requiring servicing and a code characterizing the type of work that will be executed. The conflict resolution module includes a plurality of configurable rules characterizing permissible and impermissible work orders based on the timing of existing work orders. As an example, the rules may specify that during a time window assigned to a given work order for a given transmission line or feeder lines, no other work can commence on the given feeder and/or connecting feeder lines. Conversely, in that same situation, work order requests for a relay upstream of the given feeder may be permitted during the same time window as the given work order. Accordingly, the work order request for work on the relay upstream of the given feeder line is accepted and scheduled as another work order. Thus, the conflict resolution module obviates the need for manual (and often inaccurate) review of work orders.

Figure 4A:
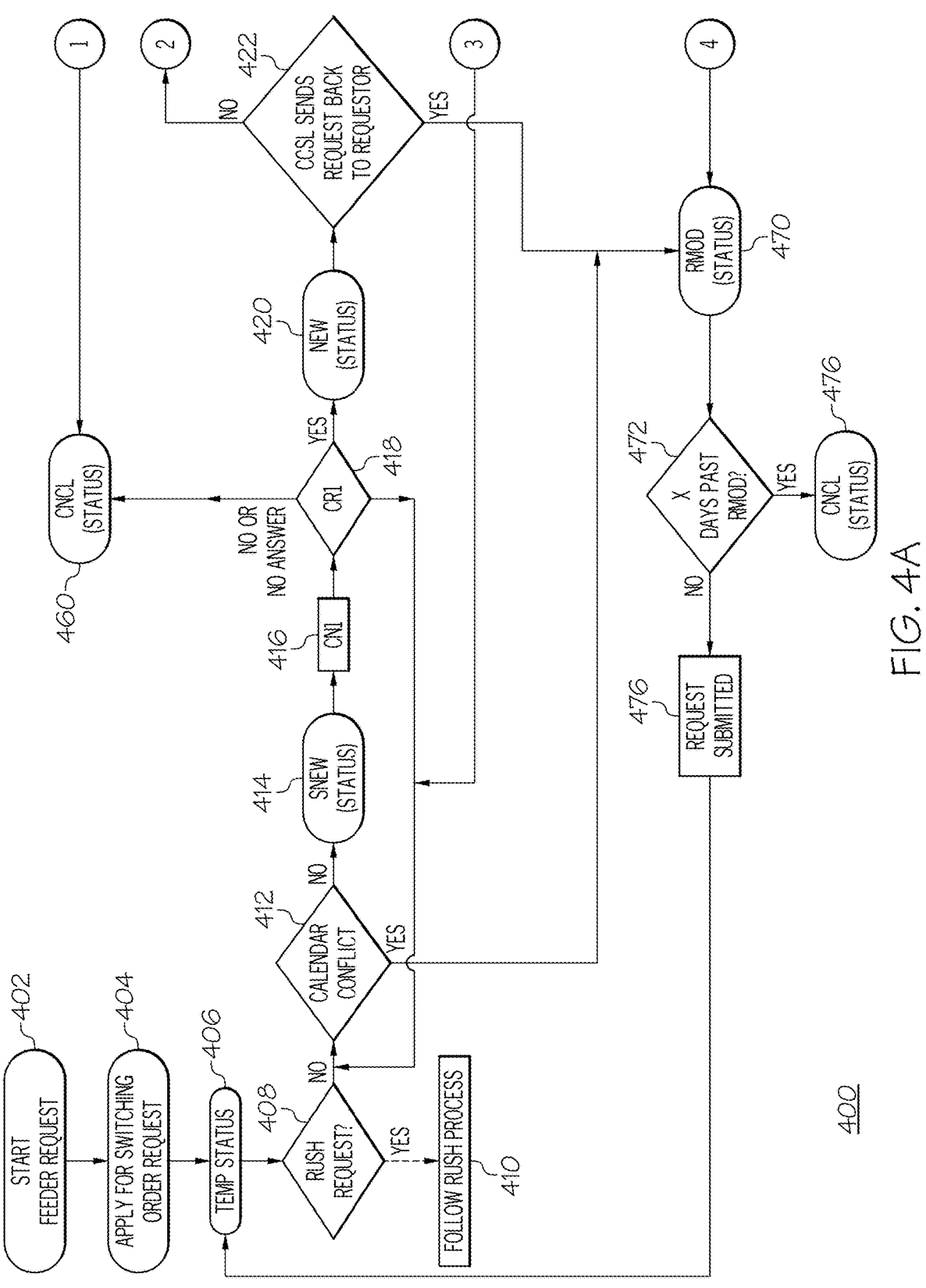
FIG. 4B is an overall process flow of managing outage and maintenance planning in a distributed electrical power grid of FIG. 1 thru FIG. 3, according to an example.
Figure 4B:
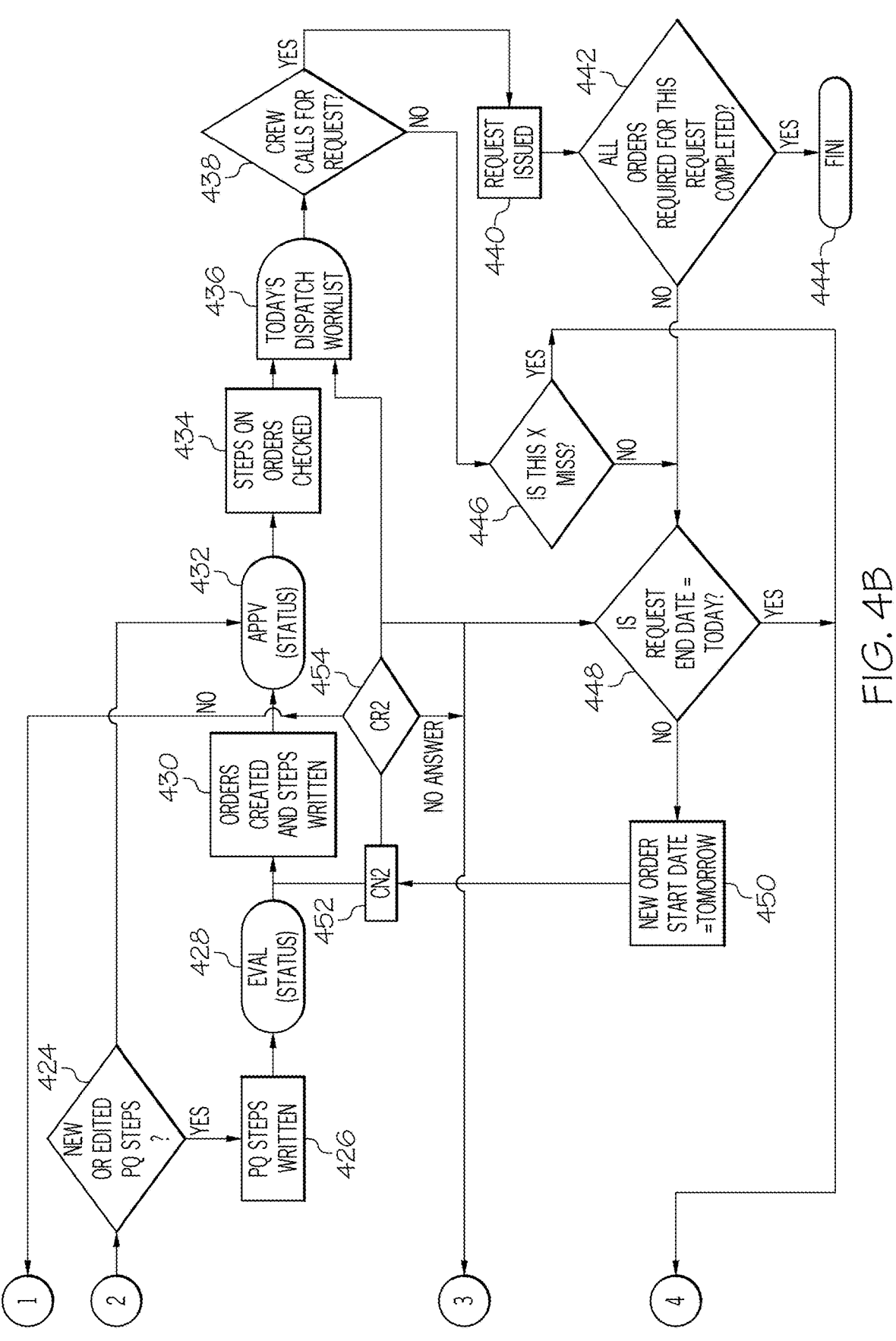

Further, the DOPT includes a work validation module shown as flow 400 in FIG. 4. This validation work module automates a process of verifying that work for scheduled work orders actually commences. A set amount of time (e.g., one day) before a time window for a given work order is to commence, the validation system sends a verification request (e.g., an email) for a work request to the requester (or another entity) for the given work order. If the requestor confirms that the work is going to commence, the validation module keeps the given work order scheduled. The work validation module is configured such that if the requestor does not respond, the work order is canceled. Additionally, the verification request includes an option to change the date and time of the work order. If the requestor selects this option, the validation module cancels the existing work order, and an updated work order is provided to the conflict resolution module to schedule the updated work order. Accordingly, the work validation module can avoid unnecessary conflicts that would otherwise occur due to unreported changes in schedules.

By employing the DOPT, the manual review of work order requests is obviated. Additionally, time lost due to work orders for work that does not actually commence (but is scheduled) is curtailed.

If an outage is scheduled at one point in a distributed electrical power grid, then power is also cut to downstream resources. Thus, if planned work is scheduled on downstream resources while power is out due to work on upstream resources, then there's an improvement because the overall customer outage time is reduced (the customers of the downstream element only experience one instead of two outages due to an improved scheduling process).

Overall Process Flow

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions comprising one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, are implemented by special-purpose hardware-based systems that perform the specified functions or acts or carry out combinations of special purpose hardware and computer instructions.

Turning now to FIG. 4 illustrated is an overall process flow 400 of managing outage and maintenance planning in a distributed electrical power grid of FIG. 1 through FIG. 3, according to an example. The process starts in step 402. In this example, a feeder-type request is described. It is important to note that a feeder request is only one type of request. Other types of requests include a ReClosing (RC) request with remote turn off of option for equipment and ReClosing request with sectionalizing (RF) with switching+RC, a substation request, or others. The flows for these other requests include these novel notifications and confirmation in this flow, as described further below.

Next, the process immediately proceeds to step 404, in which a request for a switching order is created. The process continues to step 406, in which a temporary status is set as shown. The process continues to step 408.

In step 408, a test is made to determine if the request is a rush request or a normal request. In the case of a rush request, the process flows to step 410. Step 410 is a prior flow, which is outside the scope of the present invention. In the case of the request not being a rush request, the process continues to step 412.

In step 412, a calendar conflict check is performed. The purpose is to check for any other previously scheduled outage of the same components for a given time and given date. In response to a previously scheduled outage that was already planned, the process continues to step 470, in which the request is changed to modified status (RMOD) and sent back to the requestor. This RMOD will be discussed further below. Otherwise, if there is no calendar conflict, the process continues to step 414. The request status is changed to a temporary new status (SNEW), which is new on the schedule, and the process continues to step 416.

It is important to note that in one example, any downstream sources that will be de-energized during a work order for an upstream component can be identified. The system may optionally reschedule any previously downstream equipment maintenance to be during the same time the upstream equipment is being maintained. Other determining factors like crew availability, maintenance parts, and length of relative maintenance of each piece of electrical equipment are also determined. The order and at least one pending previous order is scheduled on the same date.

Unlike prior solutions, the present invention provides a unique improvement because the overall customer outage time is reduced. State differently, the customers of the downstream element.

A first notification (CN1) 416 and verification (CR1) 418 steps are performed. The parameters of this CN1 and CR1 are configurable. For example, one configurable parameter is an amount of time (e.g., hours, days, weeks, months) before the request start date. The notification may be a text, email, automated interactive voice response system, or other notification in which the requester starting the request in step 402 must give a response or answer. This type of notification may also be configurable. Once this first verification is confirmed, the process moves from temporary SNEW status to just NEW status. It is only when the NEW status is achieved that a switching lead can review the request.

There are three possibilities with the response to CN1 as follows: i) no response, ii) response or iii) response with new date. In the case of "no response" to CN1, in step 416, the process continues to step 460. Otherwise, if a "response is received" within the configurable time, the process continues to step 420. Otherwise, if there is a "response with new date" for the request the process flows back to step 412.

Step 460 is a canceled status (CNCL). Note that one of the benefits of the present invention at this point in time is this is not work done by the distribution control center (DCC). At this point, the request can be canceled. This CR1 test ensures that the DCC did not waste any effort. The flow ends after step 460. Otherwise, the process continues to step 420, in which the status NEW is maintained, and the process continues to step 422.

At this point in time, the control center switching lead (CCSL) is aware of the initial request. In step 422, a test is made. Specifically, the test determines whether the control center switching lead (CCSL) sends the request back to the requestor. The reasons to send the request back to the requestor include not enough details in the initial request or power loads are too high because of seasonal demand during the specific requested time period. In the case that the CCSL sends the request back to the requestor, the process goes to modification status RMOD in step 470. Otherwise, if the CCSL does not send the request back to the requestor, the process continues to step 424.

In step 424, a test is made. More specifically, the test is whether new or edited power quality (PQ) steps are required. In the case no new power steps are required, the process continues to step 432 with an approved status (APPV). Otherwise, with new PQ steps required, the process continues to step 426.

In step 426, new PQ steps are composed. Power quality steps may address high harmonic in the distribution system, low power factor, voltage transients, voltage flicker, active power, and reactive power to ensure customer load is not lost during the switching process. Due to poor power quality, the performance of various sensitive loads is very poor. Once the new PQ is written, the process continues to step 428. In parallel to the process continuing to step 428, a second path is taken. Specifically, this second path is a second notification (CN2) is dispatched in step 452. Like CN1 this CN2 has configurable parameters, including time periods and how the notification is sent, for example, by email, text, interactive voice system, or other systems, which record an answer. However, unlike CN1, at this point in this flow, the control center switching lead and perhaps a dispatcher have already begun work. Rather than cancel the request, the system tries to modify the request to increase efficiency.

In step 428, the new PQ steps are part of the request and are placed as evaluation status (EVAL). Next, the orders are created and written in step 430. These orders are typically written out by a first dispatcher. The process continues to step 432, in which the approved status (APPV) is set. The process continues to step 434, in which the steps on the order are rechecked. The rechecking is typically performed by a second dispatcher. The process continues to step 436.

Step 436 is a Boolean AND logic. Both the steps of i) the order check and ii) a response to notification CRS received in step 454 must be successful for the process to continue.

The response for step 454 is a final check. In step 454, three responses are possible as follows: i) no, ii) different date, or no answer. In the case the response is "no", just like a response not received with the first notification CN1, the process goes to step 460 in which the order is set with canceled status (CNCL). If the response is for a "different date" then the process returns to step 412 for a calendar check. In the case, there is "no response", a test is made in step 448.

In step 448, a test of the request end date is equal to today. This test makes sure that previously scheduled work may still be scheduled. If it is equal to today, then there is not enough time to carry out the order, and the request date is automatically reset to tomorrow in step 450. The process returns to step 452 for a second notification CN2. Otherwise, if the requested date in step 448 is not the end date of today, the process continues to step 470 with a modified status (RMOD).

Once the Boolean AND gate logic both successfully received the i) the order check and ii) a response to notification CRS received in step 454, only at this point does the process continue to step 438. In step 438, a test is made to see if a crew solicits the system for a request. In the case the crew solicits the system in, the process continues to step 440. Otherwise, if there is no request from the crew, the process goes to step 446 to test if the request is missed. If the request is missed the process goes to modified status 470. If the request is not missed in step 446, the process flows to step 448.

In an optional embodiment, as part of step 440, the system automatically identifies at least one switchgear and/or one or more reclosers in the distributed electrical power grid that controls the at least one piece of selected electrical equipment. Next, the system automatically sends a control signal to the switchgear and/or the reclosers to maintain a lockout stage during a scheduled maintenance period in the request. The lockout stage prevents re-energizing the at least one piece of selected electrical equipment during a scheduled maintenance period in the request.

In step 442, a test is made to see if all the orders required for the request have been completed. If yes, the process finishes in step 444. Otherwise, the orders that were not completed are tracked by going back to step 448 to determine the request dates.

In the RMOD status in step 470, the process continues to step 472 to see if a settable time period past the RMOD date has elapsed. If the time has elapsed, the process goes to step 476 in which the request is set to canceled status (CNCL). Otherwise, in the case the time-period has not passed, the process goes to step 476 in which the request is resubmitted, and returns to step 406 to set the status to temp (TEMP). If the request is in RMOD for configurable x for a time-period (hours, days, weeks, months), it will then be canceled. If the request is resubmitted before reaching the time-period, it will then move to TEMP status and go back through Calendar Conflict. This is typically sent in a configurable time-period before the request date. For example, one day before verification for the first order will be based on the request start date. The remainder of the day before verifications will be based on the order start date.

Non-Limiting Examples

Although specific embodiments of the subject matter have been disclosed, those having ordinary skill in the art will understand that changes are made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A computer-implemented method executed on a server for managing outage and maintenance planning in a distributed electrical power grid, the method comprising:

receiving, via a graphical user interface on a requestor device, an order having a request date and a type of service, the order being part of a request for at least one of: i) installation of at least one piece of electrical equipment in the distributed power grid and ii) personnel to perform the installation;

accessing a database of requests communicatively coupled to the server, identifying conflicts between the order requesting de-energization of a given portion of the distributed power grid during a given time-frame and other orders requesting de-energization of the given portion or an adjacent portion during the given time-frame;

identifying, based on the conflicts, customers receiving power from the distributed power grid that are impacted by the de-energization;

coordinating the order and the other orders so that the identified customers experience only a single power interruption;

removing from a planning workflow any order incompatible with another order requesting the same or an adjacent portion of the distributed power grid during the same time-frame, and sending a cancellation notice for the removed order to a corresponding requestor device;

sending a first confirmation notification for the order to the requestor device, with the order remaining in the planning workflow;

storing the order in the database with a status of "new," and sending a request notification to the requestor device indicating that the order has been placed;

reviewing, by a control center switching lead (CCSL), the order stored in the database to identify other types of conflicts;

changing the status of the order to "modify" in the database, with the identification of another type of conflict by the CCSL, and sending a modify notice to the requestor device;

building out sub-steps required to fulfill the order with no other conflict identified by the CCSL, sending a second confirmation notification to the requestor device, and storing the order with the status of "approved" in the database;

if a second confirmation is not received by the server and a request end date is not equal to a date the second confirmation is received, adjusting the request date of the order to a future date;

dispatching the order to a crew to perform the request in the order; and sending, from the server, a control signal to at least one of at least one switchgear and one or more reclosers to maintain a lockout state that prevents re-energizing the given portion of the distributed power grid during a scheduled maintenance period specified in the order that has been previously coordinated with the other orders.

2. The computer-implemented method of claim 1, wherein the second confirmation notification which is populated with a status tag of the at least one piece of electrical equipment.

3. The computer-implemented method of claim 1, further comprising:

retrieving a status tag indicating a repair state of the at least one piece of electrical equipment further includes determining, based on the type of service for the at least one piece of electrical equipment, a de-energized section of the distributed electrical power grid will have power shut off;

identifying any other electrical equipment in the de-energized section of the distributed electrical power grid with at least one previous pending order for a previous date; and coordinate the order and the at least one pending previous order to be scheduled on a same date.

4. The computer-implemented method of claim 1, further comprising:

determining that the order in the request is not completed by the crew and placing the order back on a calendar for tomorrow a following day.

5. The computer-implemented method of claim 1, further comprising:

receiving a work complete confirmation by the crew in response to the order being completed and updating the status of the request to finished.

6. The computer-implemented method of claim 1, wherein the receiving the order with a request date and type of service from a graphical user interface on at least one requestor device, further includes at least one additional order generated through a combination of smart meter data and machine learning.

7. The computer-implemented method of claim 1, wherein the accessing a database of requests communicatively coupled to the server, to identify conflicts between the order requesting a given portion of the distributed electrical power grid be de-energized during a given time-frame includes a travel time between a current geographic location of the crew and the electrical equipment.

8. The computer-implemented method of claim 1, wherein the given time-frame is based on an inventory of equipment used for the maintenance.

9. The computer-implemented method of claim 1, wherein the conflicts are based on a plurality of configurable rules characterizing permissible and impermissible work orders dependent on a timing of existing work orders, whereby the configurable rules specify that during a time window assigned to a given work order for a given transmission line or feeder lines that either i) no other work can commence on a given feeder and/or connecting feeder lines or ii) work order requests for a relay upstream of the given feeder is permitted during the same time window as the given work order.

10. A server system for managing outage and maintenance planning in a distributed electrical power grid, the server system comprising:

a computer memory capable of storing machine instructions; and a hardware processor in communication with the computer memory, the hardware processor configured to access the computer memory to execute the machine instructions to perform receiving, via a graphical user interface on a requestor device, an order having a request date and a type of service, the order being part of a request for at least one of: i) installation of at least one piece of electrical equipment in the distributed power grid and ii) personnel to perform the installation;

accessing a database of requests communicatively coupled to the server, identifying conflicts between the order requesting de-energization of a given portion of the distributed power grid during a given time-frame and other orders requesting de-energization of the given portion or an adjacent portion during the given time-frame;

identifying, based on the conflicts, customers receiving power from the distributed power grid that are impacted by the de-energization;

coordinating the order and the other orders so that the identified customers experience only a single power interruption;

removing from a planning workflow any order incompatible with another order requesting the same or an adjacent portion of the distributed power grid during the same time-frame, and sending a cancellation notice for the removed order to a corresponding requestor device;

sending a first confirmation notification for the order to the requestor device, with the order remaining in the planning workflow;

storing the order in the database with a status of "new," and sending a request notification to the requestor device indicating that the order has been placed;

reviewing, by a control center switching lead (CCSL), the order stored in the database to identify other types of conflicts;

changing the status of the order to "modify" in the database, with the identification of another type of conflict by the CCSL, and sending a modify notice to the requestor device;

building out sub-steps required to fulfill the order with no other conflict identified by the CCSL, sending a second confirmation notification to the requestor device, and storing the order with the status of "approved" in the database;

if a second confirmation is not received by the server and a request end date is not equal to a date the second confirmation is received, adjusting the request date of the order to a future date;

dispatching the order to a crew to perform the request in the order; and sending, from the server, a control signal to at least one of at least one switchgear and one or more reclosers to maintain a lockout state that prevents re-energizing the given portion of the distributed power grid during a scheduled maintenance period specified in the order that has been previously coordinated with the other orders.

11. The system of claim 10, wherein the second confirmation notification which is populated with a status tag of the at least one piece of electrical equipment.

12. The system of claim 10, further comprising:

retrieving a status tag indicating a repair state of the at least one piece of electrical equipment further includes determining, based on the type of service for the at least one piece of electrical equipment, a de-energized section of the distributed electrical power grid will have power shut off;

identifying any other electrical equipment in the de-energized section of the distributed electrical power grid with at least one previous pending order for a previous date; and coordinate the order and the at least one pending previous order to be scheduled on a same date.

13. The system of claim 10, further comprising:

determining that the order in the request is not completed by the crew and placing the order back on a calendar for a following day.

14. The system of claim 10, further comprising:

receiving a work complete confirmation by the crew in response to the order being completed and updating the status of the request to finished.

15. The system of claim 10, wherein the receiving the order with a request date and type of service from a graphical user interface on at least one requestor device, further includes at least one additional order generated through a combination of smart meter data and machine learning.

16. The system of claim 10, wherein the first confirmation of the request is received prior to any work beginning on the order at a distribution control center, and wherein otherwise cancelling the request and sending a cancellation notice due to lack of verification to the requestor device occurs prior to any work beginning on the order at the distribution control center.

17. The system of claim 10, wherein the accessing a database of requests communicatively coupled to the server, to identify conflicts between the order requesting a given portion of the distributed electrical power grid be de-energized during a given time-frame includes a travel time between a current geographic location of the crew and the electrical equipment.

18. The system of claim 10, wherein the conflicts are based on a plurality of configurable rules characterizing permissible and impermissible work orders dependent on a timing of existing work orders, whereby the configurable rules specify that during a time window assigned to a given work order for a given transmission line or feeder lines that either i) no other work can commence on a given feeder and/or connecting feeder lines or ii) work order requests for a relay upstream of the given feeder is permitted during the same time window as the given work order.

* * * * *